Figure 1:
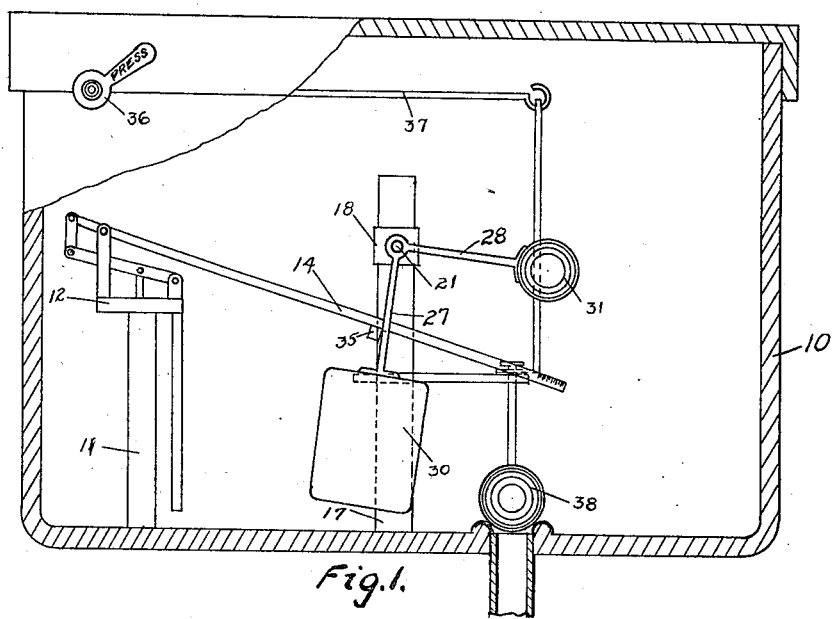

July 8, 1924.                                                                                         1,500,669
H. R. CUNNINGHAM
VALVE CONTROL MECHANISM FOR CONTAINERS
Filed Dec. 21, 1922          2 Sheets-Sheet 1

INVENTOR.
H. R. Cunningham
BY B. J. Craig
ATTORNEY.

July 8, 1924.

H. R. CUNNINGHAM 1,500,669

VALVE CONTROL MECHANISM FOR CONTAINERS

Filed Dec. 21, 1922    2 Sheets-Sheet 2

INVENTOR.

BY H. R. Cunningham

B. J. Craig
ATTORNEY.

Patented July 8, 1924.

1,500,669

UNITED STATES PATENT OFFICE.

HERMAN R. CUNNINGHAM, OF GLENDALE, CALIFORNIA.

VALVE-CONTROL MECHANISM FOR CONTAINERS.

Application filed December 21, 1922. Serial No. 608,206.

*To all whom it may concern:*

Be it known that I, HERMAN R. CUNNINGHAM, a citizen of the United States, residing at Glendale, in the county of Los Angeles and State of California, have invented a certain new and useful Improvement in Valve-Control Mechanism for Containers, of which the following is a full, clear, and exact description, reference being had to the accompanying drawings.

This invention relates to devices for operating valves which control the flow of water to and from containers, and has particular reference to such devices as are adapted for controlling the flow of water to flushing tanks.

In flush tanks now in general use, when the tank is emptied, a valve is opened which allows the water to flow into the tank and as the level of water rises it carried a float with it. The float is connected to the valve controlling the inflow, so that when a certain height is reached the valve gradually closes.

The valve control mechanism mentioned as in general use is faulty in that a loud, objectionable, hissing noise accompanies the gradual closing of the valve. There is also the objection that after the valve becomes slightly worn there is a likelihood of leaks developing due to the fact that the float is only partially submerged so that its full buoyant effect is not available to hold the valve to its seat.

The general object of my invention, therefore, is to provide a flush tank with a valve control mechanism which is positive in its operation and which will quickly and quietly close the valve after the water in the tank reaches a certain predetermined height.

An object of the invention is to provide a valve closing means, so constructed that it may be applied to the standard types of flush tank valves now in use.

An additional object of the invention is to provide a flush tank valve control mechanism which is adapted for use with constructions wherein the operating lever of the inlet valve is substantially horizontal in the cut-off position and in moving to the open position turns through but a slight angle, thus allowing a longer lever to be used than when the latter moves from a substantially perpendicular to a horizontal position in cutting off the flow.

Another object of the invention is to provide a controlling device for flush tanks wherein the height of water at which the valve closes may be adjusted.

An additional object of the invention is to provide a novel means for supporting a control mechanism for flush tank valves.

Figure 2:
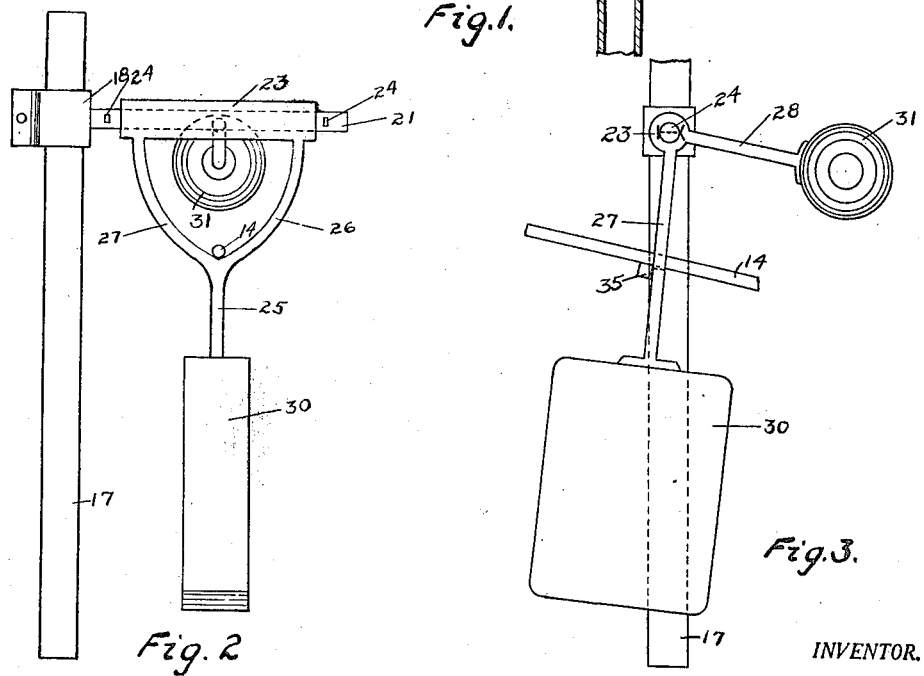
Figure 3:
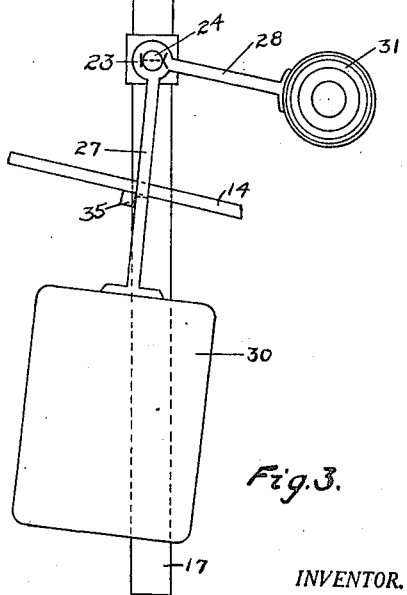
Figure 4:
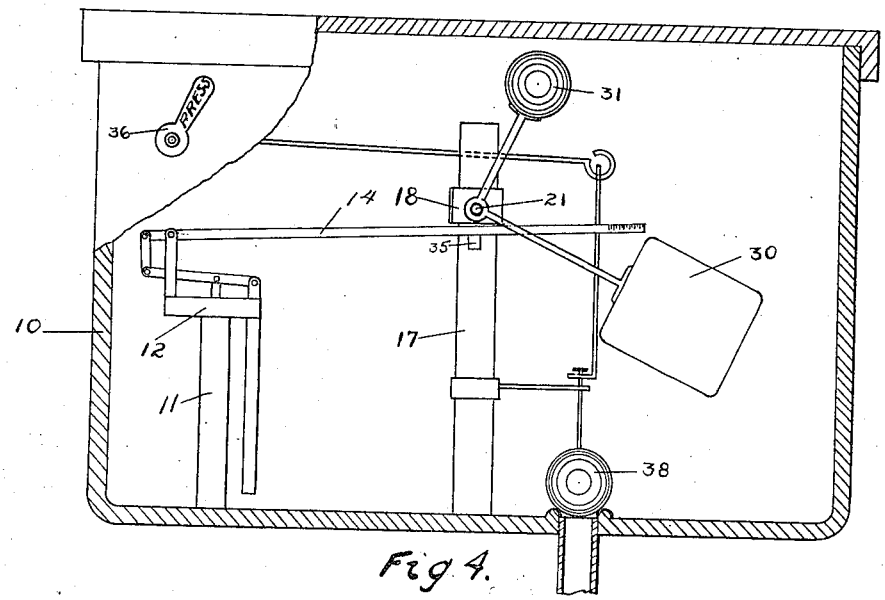
Figure 5:
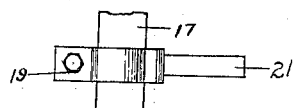
Figure 6:
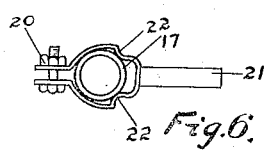

Other objects of the invention will be apparent from the following description, taken in connection with the accompanying drawings wherein: Fig. 1 is a central sectional view of a container showing my improvements in elevation; Fig. 2 is a front elevation of the floats used in connection with my improvements; Fig. 3 is a side elevation of the floats shown in Fig. 2; Fig. 4 is a sectional view similar to Fig. 1 showing the parts in another position; Fig. 5 is a side elevation, and Fig. 6 is a top plan view of one form of attachment for securing my device in position in a container.

Referring to the drawings, I have shown at 10, a container which may be provided with the usual inlet pipe 11. The flow of water from this pipe is controlled by means of a valve mechanism 12, the valve proper of which is not shown. This valve mechanism is operated by vertical movement of an operating lever 14. The arrangement is such that when the weight of the operating lever 14 causes it to be depressed the valve is opened and when the lever is raised the flow of water is shut off. Constructions of this type are old and well known in the art and further description thereof is deemed unnecessary.

My invention is particularly adapted for use in connection with flush tanks for commodes and while I have shown it as applied to a commode of standard construction, I wish it to be clearly understood that it may be applied to devices used for other purposes without departing from the spirit of my invention.

The container 10 is provided with an overflow pipe 17 which may be located near the center of the container. This overflow pipe terminates below the top of the container and at a point, preferably below its top, I mount a fastener shown in detail in Figs. 6 and 7. The fastener here shown comprises a band 18 which is adapted to extend around the pipe 17. The ends 19 of the band may be spaced and are provided with aligning apertures to receive a fastening member such as a bolt 20. A shaft 21 extends from the band 18 for a purpose to be presently described.

In order that the fastener may firmly engage overflow pipes of different standard diameters, I provide inturned curved portions 22 arranged opposite the ends 19. These curved portions engage the pipe and with the spaced points of support provided thereby, a tight engagement between the band and the overflow pipe is effected, when the bolt 20 is tightened.

Mounted to rotate on the shaft 21 I show a hub member 23 secured in place by pins 24. A stirrup 25 is shown as secured to this hub. The stirrup 25 comprises a central portion having two divergent arms 26 and 27. This stirrup may conveniently be made of sheet metal stamped to the shape shown or the stirrup may be made of wire or of any other desired material. The arms 26 and 27 are indicated as extending from the hub 23 to a float 30.

Extending from the hub 23 I also show another arm 28 which is indicated as arranged at substantially a right angle to the arms 26 and 27 although this angular arrangement may be varied as desired or necessary. A float 31 is shown as secured to the end of the arm 28.

The float 30 is preferably an elongated thin one so that it may be accommodated without interference in the container 10. This float may be rectangular in cross section or of other configuration as desired. The float 31 may be spherical or of other shape and in size it may bear any desired relation to the float 30 although I now prefer to make it of less cubical capacity than that of the float 30.

By referring to the drawings and particularly to Figs. 1 and 2 it will be noted that the valve operating lever 14 passes between the arms of the stirrup 25 and is engaged by the stirrup at the juncture of the arms 26 and 27. It will thus be seen that as the stirrup moves from the position shown in Fig. 1 to the position of Fig. 4 the lever 14 will be carried with it due to its engagement with the arms 26 and 27. When the lever 14 is raised, the flow of water from the pipe 11 is cut off so that as the float 30 moves upward the lever 14 moves with it to shut off the water supply. A projection 35 on the lever 14 serves to limit the movement of the stirrup 25.

The usual mechanism for operating the device is shown as comprising a lever 36 the operation of which causes the rod 37 to move in a vertical plane thereby lifting the bulb 38 from its seat.

The operation of the mechanism is as follows: Assuming that the lever 36 has been moved to operative position and the tank to be empty: The lever 14 assumes its depressed position as shown, thus opening the valve mechanism 12 so that the water is flowing into the tank. The act of emptying the tank causes the floats 30 and 31 to turn about the shaft 21 to the position shown in Fig. 1. It will be noted that the act of emptying the tank causes the stirrup 25 to be disposed at one side of the axis of the overflow pipe 17 so that consequently the float 30 is offset with respect to the axis of the shaft 21 about which it rotates.

As the height of water in the tank rises there is a tendency for the float 30 to move upwardly, but due to the fact that it hangs to one side of the vertical this upward movement is prevented. When the water in the tank reaches the float 31 its buoyancy tends to lift it and to turn the stirrup 25 about its axis. The resistance due to the off-center position of the float 30 is then overcome by the float 31 and the floats 30 and 31 swing about their axis. As soon as the stirrup 25 passes beyond the vertical position the full buoyant effect of the float 30 becomes operative and it swings upwardly quickly to the position shown in Fig. 4 carrying the lever 14 with it, and closing the valve.

From the description it will be seen that the valve remains open until the float 31 is reached by the rising water and that once the water causes the float 31 to move it in turn brings the float 30 into action, at once closing the valve so that there is no gradual lessening of the flow of water and consequently the device operates silently.

From the foregoing description it will be apparent that in operating the device described the inlet valve will be held in the fully opened position until the desired amount of water is in the container and that the valve will close immediately when the desired water level is reached.

Moreover, it will be noted that in the closed position of the valve shown in Fig. 4 that the full buoyant effect of the float 30 is available to hold the valve to its seat. Inasmuch as the float 30 which is pivoted to swing about the axis 21 engages the lever 14 beyond the pivot point 21 a compound lever is provided so that a secure seating of the valve is obtained. For this reason, the valve washers (not shown) in the valve mechanism 12 need not be renewed as frequently as is the case with the old type of constructions wherein the buoyant effect of the float is only partly utilized.

Having thus described my invention, I claim:

1. In a flush tank, a container, a water inlet leading to the container, an outlet, an overflow pipe, a valve for controlling said water inlet, a lever for operating said valve, a float pivotally mounted on said overflow pipe and means operably by the float for controlling the operation of said valve lever.

2. In a flush tank, a container, a water inlet, an outlet, an overflow pipe, a valve for controlling said water inlet, a lever for operating said valve, a float pivotally mounted on the overflow pipe, means operated by said float for moving said lever to close the valve and serving when the tank is filled to a desired height to maintain said valve closed, said lever being adapted to be depressed by its own weight to open the valve when the tank is emptied, and means for preventing the first mentioned means from moving said lever until said tank is filled to the desired height.

3. In a flush tank, a container, an inlet thereto, a valve for controlling the inlet, a lever for operating the valve, a pivotally mounted lever, said lever comprising two arms arranged at an angle to each other, a float carried by the lever at the end of one arm, a second float mounted on the end of the other arm, one of said arms coacting with the valve lever for operating the valve.

4. In a flush tank, a container, an inlet thereto, a valve for controlling the inlet, a lever movable in a substantially vertical plane for operating the valve, said lever being movable through an arc of less than 90°, a pivotally mounted lever including two portions arranged at an angle to each other, a float carried at the end of each of said portions, a portion of said pivoted lever being arranged to engage the valve lever to close the valve.

5. In a flush tank, a container, an inlet thereto, a valve for controlling the inlet, a lever for operating the valve, an adjustably mounted shaft, a lever mounted to rock on the shaft, said lever comprising two arms arranged at an angle to each other, a float carried by the lever at the end of one arm, a second float mounted on the end of the other arm, one of said arms coacting with the valve lever for operating the valve.

6. In a flush tank, a container, an inlet thereto, a valve mechanism for controlling the inlet, a lever mounted on said valve mechanism and movable in a substantially vertical plane for operating the valve, said lever being movable through an arc of less than 90°, an adjustably mounted shaft, a lever mounted to rotate on said shaft, said last mentioned lever comprising two portions arranged at an angle to each other, and a float carried at each end of the lever, a portion of said lever being arranged to engage the first mentioned lever to close the valve.

7. In a flush tank, a container, a water inlet, an outlet, an overflow pipe, a valve for controlling said water inlet, a lever for operating said valve, a float in said container mounted on the overflow pipe, a second float mounted in said container above the first float, means movable by the first mentioned float for engaging the lever to hold the valve closed when the floats are in one position, the weight of said lever acting to hold the valve open when the floats are in another position, said means having a sliding engagement with the lever while the floats are passing from one position to another.

8. In a flush tank, a container, a water inlet, an outlet, an overflow pipe, a valve near one end of the container for controlling said water inlet, a lever for operating said valve said lever terminating beyond the center of the container, a float pivotally mounted on said over-flow pipe near the end of said lever and means operable by the float and coacting with the lever for controlling the operation of said lever.

9. In a flush tank, a container, an inlet thereto, a valve for controlling the inlet, a lever having a free end for operating the valve, a shaft, a lever mounted to rock on the shaft, said shaft being spaced from and arranged intermediate the ends of the valve operating lever said lever comprising two arms arranged at an angle to each other, a float carried by the lever at the end of one arm a second float mounted on the end of the other arm, one of said arms coacting with the valve lever at a point intermediate the pivot shaft and the free end of the lever to provide a compound lever for operating the valve.

In testimony whereof, I hereunto affix my signature.

HERMAN R. CUNNINGHAM.